United States Patent [19]

Blair

[11] 4,027,840
[45] June 7, 1977

[54] VEHICLE POSITION INDICATOR WITH RADAR INTERROGATION EACH OF SPACED TRANSPONDERS DISPOSED ALONG A PATHWAY FOR THE VEHICLE

[75] Inventor: Peter Kenneth Blair, Harlow, England

[73] Assignee: International Standard Electric Corporation, New York, N.Y.

[22] Filed: Sept. 30, 1975

[21] Appl. No.: 618,184

[30] Foreign Application Priority Data

Oct. 15, 1974 United Kingdom ............ 44566/74

[52] U.S. Cl. .......................... 246/122 R; 340/23; 340/47; 340/408; 343/6.5 R; 343/6.8 R
[51] Int. Cl.² ........................................ G01S 9/56
[58] Field of Search .......... 246/2 R, 2 F, 2 S, 34 R, 246/34 CT, 63 R, 63 A, 63 C, 122 R, 182 B; 340/23, 47, 146.3 K, 408; 343/6.5 R, 6.5 LC, 6.5 SS, 6.8 R, 6.8 LC

[56] References Cited

UNITED STATES PATENTS

| | | | |
|---|---|---|---|
| 3,184,737 | 5/1965 | Child | 343/6.8 R |
| 3,685,050 | 8/1972 | Cartwright | 343/6.8 R X |
| 3,706,094 | 12/1972 | Cole et al. | 343/6.8 R X |
| 3,780,370 | 12/1973 | Reeves | 343/6.5 R X |
| 3,888,437 | 6/1975 | Birkin | 246/63 R X |
| 3,919,708 | 11/1975 | Pudsey | 343/6.5 R |

OTHER PUBLICATIONS

*Automatic Systems of Wagon Identification,* The Railway Gazette, June 18, 1965, pp. 489–497.

*Primary Examiner*—Stephen G. Kunin
*Attorney, Agent, or Firm*—John T. O'Halloran; Alfred C. Hill

[57] ABSTRACT

This invention applies to an automatic train control system. A low power radar mounted beneath a train interrogates simple passive transponders mounted between the rails. Each transponder includes a reflective delay line. The radar has a number of range gates. The transponder delays are arranged in a simple code which provides information as to the location of the train along the track. The outputs of the range gates can be fed to a simple computer which can also receive wheel revolution pulses from an axle mounted transducer. The computer can then calculate the distance travelled at any given moment to within one meter from the last transponder over which the train has passed.

4 Claims, 3 Drawing Figures

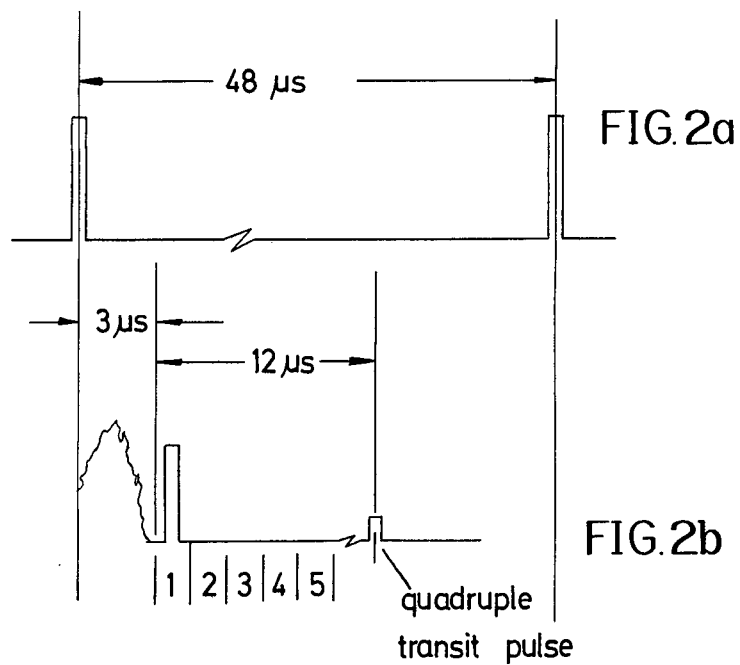

VEHICLE POSITION INDICATOR WITH RADAR INTERROGATION EACH OF SPACED TRANSPONDERS DISPOSED ALONG A PATHWAY FOR THE VEHICLE

BACKGROUND OF THE INVENTION

This invention relates to a vehicle position indicating system. According to the invention there is provided a vehicle position indicating system including a pulse radar transmitter/receiver and a plurality of passive transponders each of which has an antenna coupled to a reflective delay line, different transponders having different delays, the radar and the transponders being arranged for relative movement in respect of each other as a consequence of movement of a vehicle so that passage of a transponder past the radar causes the transmitted radar pulses to be reflected and received at the radar after a time determined by the transponder delay, the radar receiver having a plurality of so-called "range-gates" whereby the received pulses may be classified into time intervals corresponding to the different transponder delays.

In a preferred embodiment of the invention the radar is mounted on a train and the transponders are disposed sequentially at intervals along the track.

The above and other features of the invention will become more apparent from the following description of an embodiment thereof with reference to the accompanying drawings, in which:

BRIEF DESCRIPTION OF THE DRAWINGS

FIGS. 2(a) and 2(b) illustrate certain waveforms relating to the opeation of the system of FIG. 1.

DESCRIPTION OF THE PREFERRED EMBODIMENT

Figure 1:
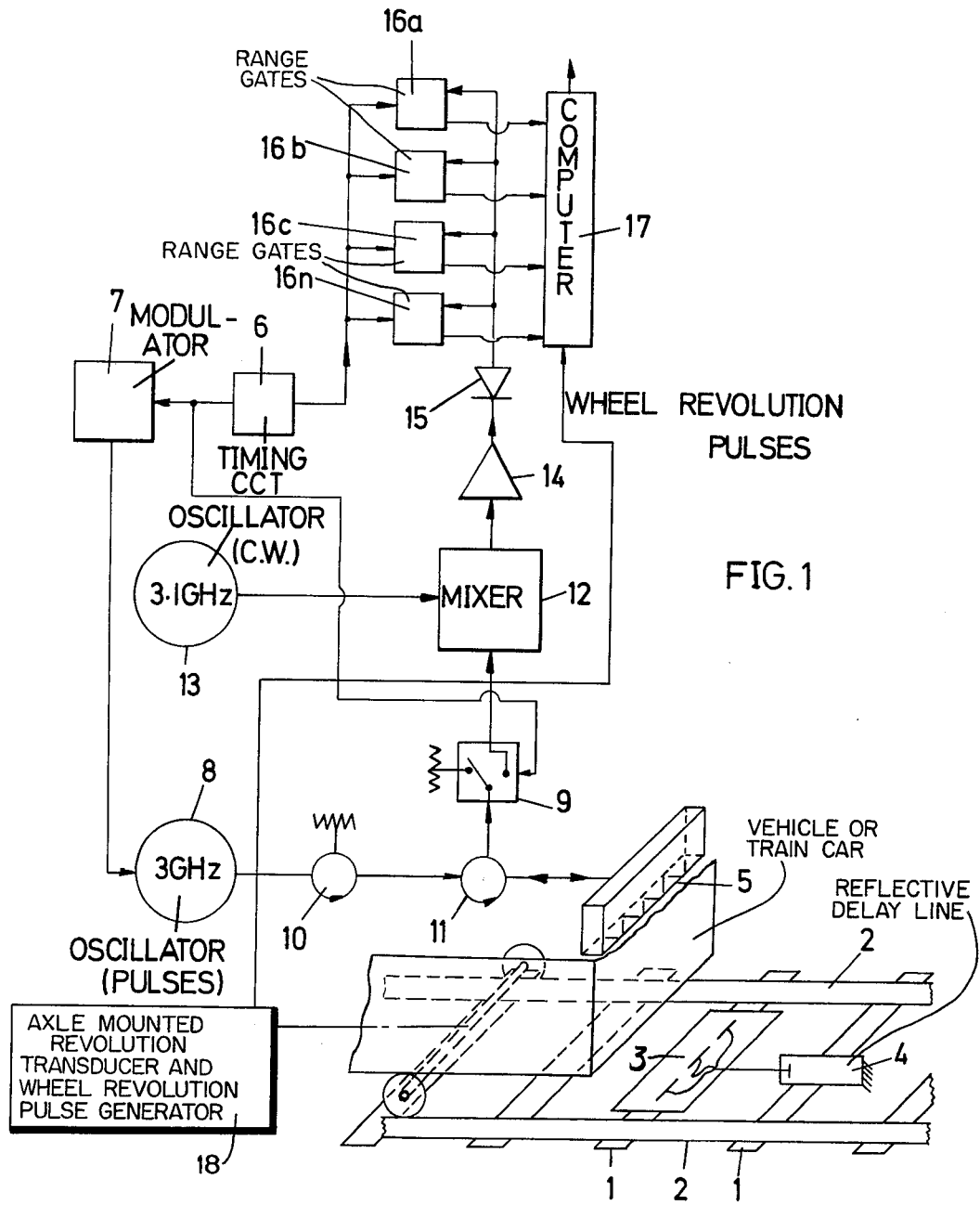
FIG. 1 is a diagrammatical illustration of a train position indicating system according to the invention.

In the embodiment shown in FIG. 1 a transponder is affixed to the sleepers 1 between the rails 2 of a railway track. The transponder consists of a printed circuit antenna array 3 connected to a reflective delay line 4.

Mounted on the underside of a train is a radar antenna 5. This is coupled to a low power radar transmitter/receiver which is indicated by the remaining parts of the figure. A timing circuit 6 controls modulator 7 which causes the pulse generating oscillator 8 to send out 3 GHz pulses of 0.5 $\mu$s duration at intervals of 33 $\mu$s, as shown in FIG. 2(a). At the same time the timing circuit 6 sets switch 9 to a transmit mode. The pulses are sent via the isolating circulator 10 and the transmit/receive circulator 11 to the antenna 5. Aftr each pulse has been transmitted, and with a suitable delay to eliminate ground echoes, timing circuit 6 sets switch 9 to a receive mode. The recevied (reflected) pulses are fed to a mixer stage 12 togethr with a 3.1 GHz singal from oscillator 13. The resultant 100 MHz beat frequency pulses are amplified in the I.F. amplifier 14 and fed to detector stage 15. The detected output is then applied to a series of range gates 16a ... 16n which are open at predetermined times by the timing circuit 6.

The transmitted pulse is received and retransmitted delayed by the double transit time of the transponder delay line. The radar transmitter has a relatively long period to interrogate the transponder. For a speed of 100 mph and an interrogation distance of 1 foot there is nearly 6 ms allowing many successive interrogations to enable integration to be performed. After each pulse has been transmitted a period of 3 $\mu$s is allowed to elapse before switch 9 is set to the receive mode to allow all multiple ground-train echoes to subside. If the transponder delays are varied in steps of 0.5 $\mu$s then up to 18 different delays can be utilized without any ambiguity from the quadruple transit pulses which will also be transmitted from the transponders approximately 9 $\mu$s after the switch 9 is operated. If the transponders are spaced at say 100 meter intervals then a code repetition can be obtained every 1.8 km. With a 48 $\mu$s pulse repetition frequency (30KHz) and utilizing S-band pulses (3GHz) the bandwidth occupancy of the system is only about 2 MHz plus transmitter/receiver drift. The radar power required can be quite low, e.g. about 500 mW even accounting for rain or snow losses.

The outputs of the range gates can be fed to a simple computer 17 which can also receive wheel revolution pulses from an axle mounted transducer and wheel revolution pulse generator 18. The computer can then calculate the distance travelled at any given moment to within 1 meter from the last transponder over which the train has passed.

To provide more information and resolve ambiguity it is possible to have every 10th, or 100th transponder coupled to two or more different delays which will give a unique response every 1.8 km or 18 km.

While the invention has been described in terms of track mounted transponders and a train mounted radar it is envisaged that it is also applicable to other forms of traffic, e.g. road traffic. It is also possible that the radar could be stationary and the transponders mounted on objects which are moved past the radar, thus providing a means of monitoring objects moving past a fixed point.

It is to be understood that the foregoing description of specific examples of this invention is made by way of example only and is not to be considered as a limitation on its scope.

What is claimed is:

1. A vehicle position indicating system including a pulse radar transmitter/receiver and a plurality of passive transponders each of which has an antenna coupled to a reflective delay line, different transponders having different delays, the radar and the transponders being arranged for relative movement with respect to each other as a consequence of movement of a vehicle so that passage of a transponder past the radar causes the transmitted radar pulses to be reflected and received at the radar after a time determined by the transponder delay, the radar receiver having a plurality of range gates whereby the received pulses may be classified into time intervals corresponding to the different transponder delays; the radar including a transmitter/receiver coupled to an antenna, and a timing circuit to control the emission of pulses by the transmitter, the timing circuit also controlling the operation of the receiver a predetermined time after the emission of a pulse by the transmitter and the opening of the range gates at predetermined times.

2. A system according to claim 1 wherein the radar is mounted on a vehicle and the transponders are disposed sequentially at intervals along the track.

3. A system according to claim 2 wherein selected transponders have two or more different reflective delays connected to the same antenna.

4. A system according to claim 1 including an axle mounted revolution transducer, means for deriving wheel revolution pulses from the axle mounted transducer, and distance computing means to which the outputs of the range gates and the wheel revolution pulses are fed.

* * * * *